United States Patent [19]

Horton et al.

[11] Patent Number: 5,771,971

[45] Date of Patent: Jun. 30, 1998

[54] CLAY STABILIZING AGENT AND A METHOD OF USE IN SUBTERRANEAN FORMATIONS TO INHIBIT CLAY SWELLING

[76] Inventors: David Horton, 4031 Rundlehorn Drive N.E., Calgary, Alberta, Canada, T1Y 2K2; Alan Jones, 203 Silverbrook Way NW., Calgary, Alberta, Canada, T3B 3G7

[21] Appl. No.: 660,182

[22] Filed: Jun. 3, 1996

[51] Int. Cl.$^6$ ............................................. E21B 43/26
[52] U.S. Cl. ................................. 166/283; 166/295
[58] Field of Search .......................... 166/283, 292, 166/295, 308, 305.1

[56] References Cited

U.S. PATENT DOCUMENTS

| | | | |
|---|---|---|---|
| 4,230,183 | 10/1980 | Kalfoglou | 166/268 |
| 4,521,452 | 6/1985 | Highsmith | 405/264 X |
| 4,579,667 | 4/1986 | Echt et al. | 166/308 |
| 4,579,670 | 4/1986 | Payne | 166/308 X |
| 4,579,671 | 4/1986 | Lundberg et al. | 166/308 |

*Primary Examiner*—William P. Neuder

[57] ABSTRACT

Clay stabilizing agents used in fracturing fluids produce noxious odours, raise environmental concerns or are less than effective in subterranean formations of low permeability. Disclosed herein is an alternate stabilizing agent comprising at least one organic amine selected from the group consisting of primary diamines with a chain length of 8 or less and primary alkyl amines with a chain length of 4 or less. The organic amine is admixed with the fracturing fluid in an amount not less than 0.03% by volume of the fluid and typically in the range of from about 0.06% to 0.3% by volume of the fluid.

16 Claims, 2 Drawing Sheets

CST Times for HMDA Solutions

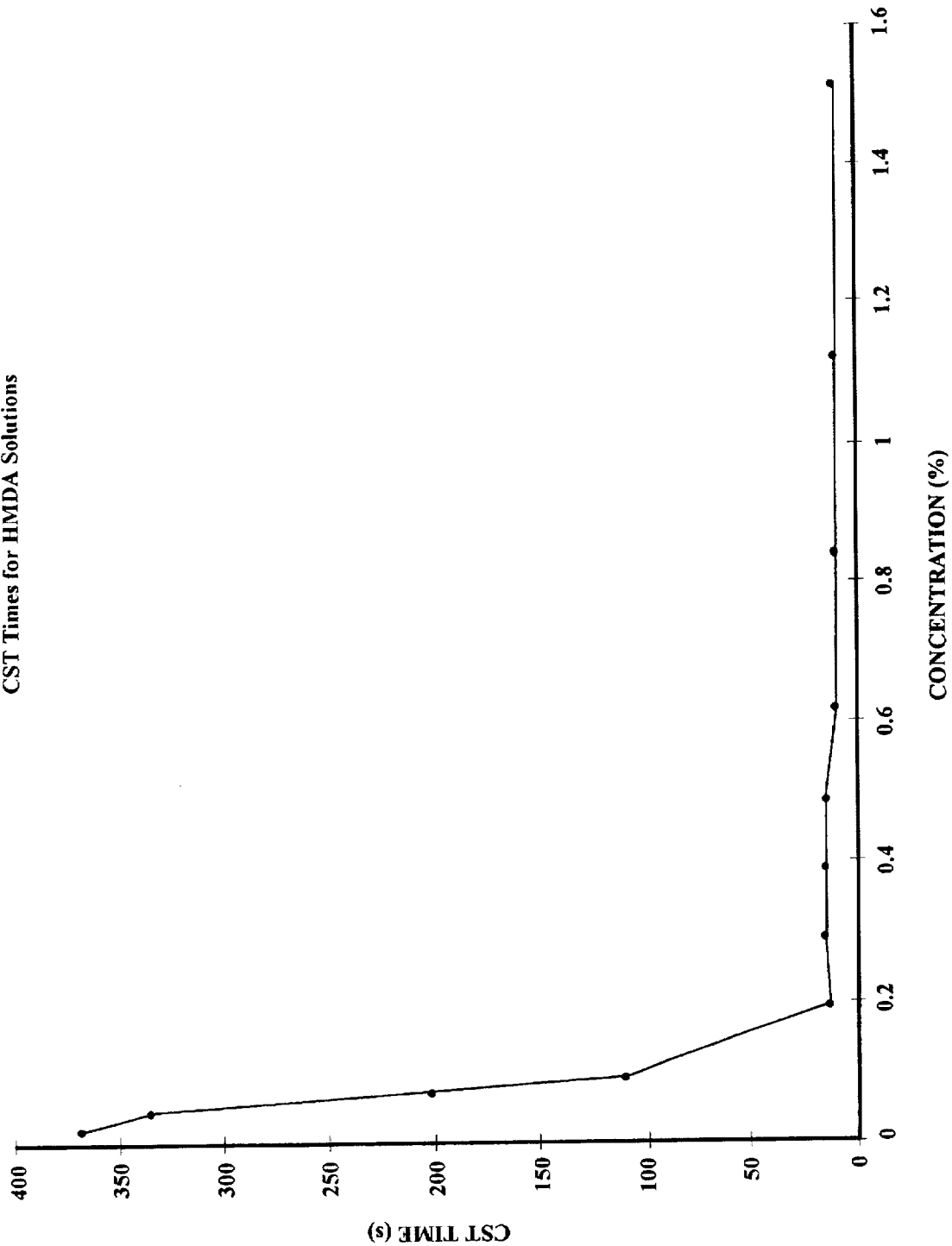

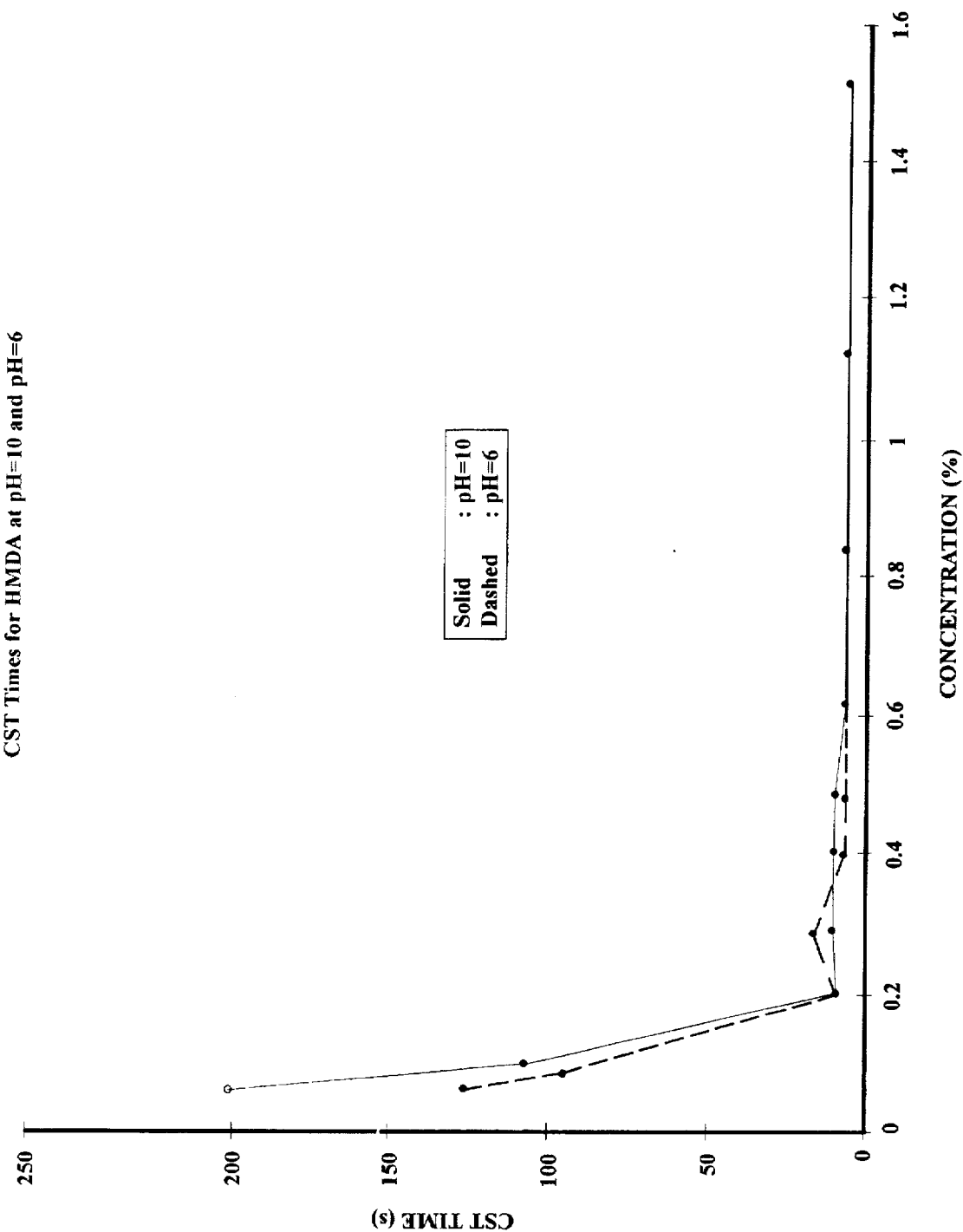

CLAY STABILIZING AGENT AND A METHOD OF USE IN SUBTERRANEAN FORMATIONS TO INHIBIT CLAY SWELLING

FIELD OF THE INVENTION

This invention relates to the practice of introducing clay stabilizing agents in oil and gas formations in an effort to substantially eliminate permeability damage from swelling and migration; and more specifically to those agents dispersed or dissolved in a carrier fluid.

BACKGROUND—PRIOR ART

Clays and fines in oil and gas producing formations are normally stable and present little obstruction to the flow of hydrocarbons within the formation until disturbed—frequently by the introduction of fluid foreign to the formation—whereafter the fines can become entrained in the fluid and may migrate through the production stream until encountering a constriction in the capillary where they can bridge off, resulting in a loss of formation permeability and significant reduction in flow rate. Migration may also be accompanied by clay swelling, further reducing formation permeability.

More often than not the foreign fluid is a fracturing fluid injected down the well and into the formation under sufficient pressure to create a crack or fracture in the formation to facilitate the flow of hydrocarbons through the formation and into the well. The practice of hydraulic fracturing is common and used to stimulate production of oil and gas, or other fluids, from subterranean formations. While a variety of fluids have been employed for hydraulic fracturing purposes, most are aqueous based and incorporate, amongst other things, one or more clay stabilizing agents, the stabilizing agents included to alleviate the problems of swelling and migration.

Not surprisingly, just what does and what does not constitute an effective clay stabilizing agent has been the subject of much investigative work and considerable inventive ingenuity and the patent literature is replete with examples of both. For example: U.S. Pat. Nos. 2,761,835 and 2,761,843 which issued to Brown in September, 1956 for "Treatment of Clays"; U.S. Pat. No. 2,861,042 which issued to Watkins in November 1958 for "Emulsion Fluid for Wells"; U.S. Pat. No. 4,974,678 which issued to Himes et al in December 1990 for a "Fluid Additive and method for treatment of subterranean formations", [Removal of polysaccharides with tetraalkylammonium halide]; U.S. Pat. No. 5,197,544 which issued to Himes in March 1993 for "Method for clay stabilization with quaternary amines; stimulating hydrocarbon production"; and U.S. Pat. No. 5,211,239 which issued to Smith et al for "Method of maintaining subterranean formation permeability and inhibiting clay swelling; enhanced oil recovery".

Most clay stabilizing agents work on the principle of substitution of a cationic species in the clay lattice for a sodium ion. The cationic species is generally selected such that its radius of hydration is less than that of the sodium ion, hence resulting in less swelling when the clay comes in contact with a foreign fluid.

Of the cationic species used, organic quaternized amines and potassium chloride (KCl) are favored. Potassium chloride has fallen out of favour of late, due to the high concentrations required for stabilization (typically 3%) and the resultant high chloride levels associated with it. As a result of this, substitute materials have been developed which are gaining ever increasing usage in drilling, fracturing and work over procedures. The two most common materials currently in use are tetramethyl ammonium chloride (TMAC) and quaternized amine polymers.

TMAC's main advantage over potassium chloride is the treatment rates that can be accomplished, typically the product is recommended at 3 L/m$^3$, a ten fold reduction over potassium chloride this of course reduces the chloride in the fracturing fluid by approximately the same magnitude. Testing of this product has shown that it is very effective in a Capillary Suction Timer (CST) test, with concentrations as low as 0.5% giving equivalent CST times to those of 3% potassium chloride on Wyoming bentonite. At the recommended treatment rate the CST times are higher than 3% potassium chloride, typically running at about 120 s. This does not appear to be a problem in the field however, as operators are running the material as low as 0.2% without any complaints of shale sloughing.

Theoretically, TMAC is the most efficient quaternized amine. Since each organic ligand is a methyl group, no reduction in molecular weight is possible, hence any other quaternized monomers will be at a disadvantage due to the necessarily higher molecular weight. The main drawback with TMAC is its odour.

The use of polyquaternized amines as clay stabilizers has been applied for many years and is exemplified in the patent literature which includes U.S. Pat. Nos. 4,366,071, 4,366,072, 4,366,073 and 4,366,073 issued to McLaughlin et al., in December 1982 and wherein is disclosed the use of essentially two main types of quat polymers, dimethyldiallyl ammonium chloride (DMDAC) polymers and copolymers, and polymers formed from epichlorohydrin and dimethyl amine.

Quaternized polymers have one main advantage over either potassium chloride or amine quat monomers—they provide permanent clay stabilization. With a monomer, or potassium based formulations, adsorption of the cation is a reversible process. When the natural fluids migrate back into the formation, over a period of time they will displace the foreign cation reverting the clay back to its natural swelling form. With the polymer there are several cationic sites adsorbed simultaneously. Typically these polymers contain anywhere from 400 to 7500 cationic sites. In order for the polymer to desorb from the clay, all of these cationic sites must simultaneously be displaced. The probability of these occurring is negligible, hence the permanent nature of the treatment.

Research suggests that the cationic quat polymers are not effective in formations with low permeability, i.e., <30 md., since the molecular weight of the polymers is believed to be a barrier to polymer migration beyond the well bore face. (Society of Petroleum Engineers, Document SPE 23438, October 1991, Himes, R. E. and Vinson, E. F., "Environmentally Safe Salt Replacement for Fracturing Fluids.") This would appear to have been the impetus behind the development of TMAC.

Heretofore known clay stabilizing agents suffer, then, from one or more shortcomings in that they:

(i) produce a significant and undesirable odour;
(ii) are less effective or non-effective as stabilizing agents in formations with low permeability; and
(iii) can present "after use" disposal problems with respect to the environment.

The above shortcomings of the prior art can be greatly alleviated by utilization of hexamethylenediamine (HMDA) or certain other organic amines as a fluid additive in place of traditional prior art materials.

SUMMARY OF THE INVENTION

According to one aspect the present invention is a clay stabilizing agent to inhibit clay swelling in subterranean formations, the stabilizing agent comprising an effective amount of at least one organic amine selected from the group consisting of primary diamines with a chain length of 8 or less carbon atoms and primary alkyl amines with a chain length of 4 or less carbon atoms.

OBJECTS AND ADVANTAGES

Several objects of the present invention are to provide a clay stabilizing agent which is substantially odour free; to provide a clay stabilizing agent that poses little threat to the environment by eliminating substantially all chlorides; to provide a clay stabilizing agent that is at least as effective as the most effective prior art agent; and to provide a clay stabilizing agent at least as cost effective as the prior art agents. Other objects and advantages of the present invention will become apparent upon consideration of the ensuing description and accompanying drawing figures.

BRIEF DESCRIPTION OF THE DRAWINGS

A present embodiment of the invention is described in detail hereinafter having reference to the accompanying drawings wherein:

FIG. 1 is a graphical plot of CST times for hexamethylenediamine (HMDA) solutions; and FIG. 2 is a graphical plot of CST times for HMDA at pH 10 and pH 6.

DESCRIPTION OF THE PRESENT EMBODIMENT

The present embodiment was chosen from the group comprising organic amines based upon the following selection criteria:

i) The molecular weight to amine ratio should be as low as possible.
ii) The material should not have any odor in the pH range of the specific application.
iii) In the pH range of the specific application the material should be completely or almost completely protonated.
iv) The material should pass microtox.
v) The material should provide equal or superior CST times to other KCl substitutes.
vi) The material should provide equal or superior return permeability in core flow studies as compared with effective solutions of KCl.

CST times for non-quaternized organic amines are pH dependent and the correct amine should be selected for the pH range of the specific application. The pH dependency of CST times for non quaternized organic amines can be explained based upon dissociation constants. When a base is protonated it is referred to as the conjugate acid. For ease of calculations, dissociation of the conjugate acid can be used for theoretical considerations.

The dissociation of an acid can be related to the dissociation constant $K_a$ by the equation:

$$K_a = [H^+][X^-]/[HX] \quad \text{i)}$$

When referring to an amine and its conjugate acid, equation i) can be rewritten as:

$$K_a = [H^+][R-NH_2]/[R-NH_3^+] \quad \text{ii)}$$

Where R is any alkyl group.

Taking logarithms of each side and rearranging, gives:

$$pH = pK_a + \log\{[R-NH_2]/[R-NH_3^+]\} \text{ where } pK_a = -\log K_a \quad \text{iii)}$$

This is more commonly referred to as the "Henderson-Hasselbach" equation. When the pH is equal to pKa, the ratio of protonated to non-protonated amine is exactly 1. For each drop of 1 pH unit, the ratio of protonated to non-protonated amine is increased 10 fold. Since lowering the pH increases the concentration of ammonium ions, CST times will decrease. At a certain pH, essentially all of the amine will be protonated and no further reduction in CST times will occur. At a pH one unit below the pKa of the amine, 91% protonation occurs, two units below 99% protonation occurs, etc. Understanding of the pH dependence of ammonium ion concentrations is a major determinant for selection of the correct amine.

If all or most of the material is protonated at the pH of the specific application not only will the efficiency be good but even if the product is volatile in the free base form, it will not be as volatile if it exists primarily as the ammonium ion in solution. Hexamethylenediamine (HMDA), a commercially produced amine, used in the nylon industry to make Nylon 66. (The reaction product of HMDA and 1,6-hexanedioic acid.) was found to offer the following advantages relative to currently used products:

i) Since the HMDA is a hexyl diamine, there are three methylene groups per amine unit compared with four methyl groups per amine unit in TMAC.
ii) HMDA is a solid up to 42° C. and does not boil until 205° C. At 100° C. its vapour pressure is 20 torr. These properties minimize the odour of the amine.
iii) The pKa's for the first and second dissociation are 11.857 and 10.762 respectively. At a pH of 10 then, the ratio of monoprotonated to unprotonated amine is 72:1, and the ratio of diprotonated:monoprotonated amine is 5.8:1. Hence approximately 98% of the product is at least monoprotonated, and approximately 85% of the product is diprotonated for an overall efficiency of approximately 92%. The high degree of protonation also ensures that little free base is left, combined with the low volatility of the product, this ensures that little or no odour is emitted.
iv) Microtox testing reveals that at treatment rates of 0.1 and 0.2% HMDA, neutralized to a pH of 6.4, both sampleshad $EC_{50}$'s >91%.
v) CST times for HMDA at pH 10 are presented in FIG. 1. It would appear that 0.75%–0.85% HMDA is equivalent to 0.15% TMAC. A 25% active product then would give CST times similar to or slightly greater than TMAC. A product with about 30% or more HMDA would give CST times similar to or slightly better than a 50% TMAC solution. HMDA is also relatively unaffected by the pH of the solution at pH's 10 or less. FIG. 2 shows CST times for HMDA at pH's of 6.3 and 10. It is not until a concentration of 0.1% HMDA is reached that a divergence in CST times becomes apparent. Even with the sample at a pH 10 and 0.1% HMDA the CST time is better than that of TMAC at 0.15%. For commercial application the product will preferably contain a minimum of 0.03% HMDA by volume with a typical application range of from about 0.06% to 0.3% HMDA by volume.

It is postulated that the reason why HMDA has such a high pKa value for the second protonation step is that the two amine units are separated by six methylene groups. These six methylene groups stabilize the diprotic amine by two methods: i) inductive effects of the methylene groups donating electron density to the protonated amine and; ii) separation of charge minimizing the coulombic repulsion of the diprotonated amine. Once the second amine is moved from the terminal position on the chain, stabilization by mechanism ii) will be adversely affected.

By way of illustration and not limitation, it is believed that since HMDA is effective as a clay stabilizer, certain other organic amines can exhibit the same behaviour. These additional organic amines comprise diamines with a chain length of 8 or less, and mono alkyl amines with a chain length of four or less.

In respect to alkyl monamines there are three categories of primary interest. The first is the homologous series of primary alkyl amines from methyl to butylamine, secondary amines including: N-methyl-N-(propyl or isopropyl) amine; N,N-diethyl amine; N-methyl-N-ethylamine; and N,N-dimethylamine. The third group of amines are the tertiary amines including N,N-dimethyl-N-ethylamine. This list can be narrowed by determination of commercially available materials listed by the Chemical Week Buyer's Guide, to include all of the primary amines, di-(ethyl or methyl) amine and N,N-dimethyl-N-ethyl amine. A summary of their physical properties, and percentage conversion to ammonium ion at pH 10 is provided in Table 1.

TABLE 1

PROPERTIES OF COMMERCIAL ALKYL AMINES CONTAINING 4 OR FEWER CARBON ATOMS

| CHEMICAL | MP(°C.) | BP(°C.) | $pK_a$ | % Converted to $NH^+$ @ pH 10 |
|---|---|---|---|---|
| Methyl Amine | −93.5 | −6.3 | 10.657 @ 25° C. | 81.9 |
| Ethyl Amine | −81 | 16.6 | 10.807 @ 20° C. | 86.5 |
| Propyl Amine | −83 | 47.8 | 10.708 @ 20° C. | 83.6 |
| Butyl Amine | −49.1 | 77.8 | 10.770 @ 20° C. | 85.5 |
| Dimethyl Amine | −93 | 7.4 | 10.732 @ 25° C. | 84.4 |
| Diethyl Amine | −48 | 56.3 | 10.489 @ 40° C. | 75.6 |
| Dimethylethyl Amine | NAV | 37 | NAV | |

A disadvantage with all of these amines is their low boiling point. Also, since these amines have a noxious odor, they require conversion to the corresponding ammonium salt. As this neutralization of the amine is extremely exothermic, handling of such a reaction may be of concern. Additionally, if the pH of the specific application were accidentally elevated above a pH of greater than $pK_a-2$, the concentration of the free base amine would increase, hence a noxious odour could be emitted from the system. Selection of the amine should be done on a cost effective basis, a weight efficiency factor has been derived that allows manufacturers to look at the raw material cost and use the factor to determine whether the amine in question is likely to be more or less economically viable than HMDA. This factor is explained below, and Table 2 summarizes weight efficiency factors at pH values of 5 and 10 for the alkyl amines, where weight efficiency is by definition:

moles R-NH3+/unit mass amine/moles R-NH3+/unit mass HMDA

TABLE 2

WEIGHT EFFICIENCY OF ALKYL MONAMINES
HMDA by definition = 1

| CHEMICAL | WEIGHT EFFICIENCY | pH = 10 | pH = 5 |
|---|---|---|---|
| Methyl Amine | 1.78 | 1.66 | 1.87 |
| Ethyl Amine | 1.27 | 1.21 | 1.29 |
| Propyl Amine | 0.893 | 0.889 | 0.983 |
| Butyl Amine | 0.853 | 0.735 | 0.794 |
| Dimethyl Amine | 1.12 | 1.15 | 1.26 |
| Diethyl Amine | 0.63 | 0.66 | |

1,X-alkyldiamines where X is the length of the alkyl chain have been considered, Including but not limited to the homologous series of amines from ethylenediamine to oct-methylenediamine. Inspection of the Chemical Week Buyers Guide indicates that the butyl and pentyl diamines are not available on a commercial basis. Table 3 summarizes the properties of some commercially available diamines.

TABLE 3

PROPERTIES OF COMMERCIAL ALKYL DIAMINES CONTAINING 4 OR FEWER CARBON ATOMS PER AMINE GROUP

| CHEMICAL | MP(°C.) | BP(°C.) | $pK_{a1}$ and $pK_{a2}$ | % Converted to mono and di-$NH^+$ @ pH 10 |
|---|---|---|---|---|
| Ethylenediamine | 8.5 | 116.5 | 10.712 @ 0° C. | mono-83.5% |
| | | | 7.564 @ 0° C. | di- 0.31% |
| Propylenediamine | 9 | 180 | 10.94 @ 10° C. | mono-81.8% |
| | | | 9.03 @ 10° C. | di- 8.77% |
| HMDA | 42 | 205 | 11.857 @ 0° C. | mono-14.7% |
| | | | 10.762 @ 0° C. | di- 85.1 % |
| Hepatmethylenediamine 1,5-diaminohexane 1,3-diaminopentane | 29 | 225 | NAV | |

HMDA has been included for comparison. As is apparent from the table, only HMDA has a large percentage of the amine converted to the diammonium ion at a pH of 10. Table 4 summarizes weight efficiencies at pH values of 5 and 10 for some alkyl diamines.

TABLE 4

WEIGHT EFFICIENCY OF ALKYL DIAMINES.
HMDA by definition = 1

| CHEMICAL | WEIGHT EFFICIENCY | |
|---|---|---|
|  | pH = 10 | pH = 5 |
| Ethylenediamine | 0.880 | 1.93 |
| Propylenediamine | 0.843 | 1.57 |
| Butanediamine | 0.912 | 1.32 |
| HMDA | 1.0 | 1.0 |

Although not known to be commercially available, butylenediamine's $pK_a$ values are listed in the CRC. The weight efficiency of this material is 0.922, again less than that of HMDA. Using suitable computer software a spreadsheet can be readily written that allows exact calculation of the efficiencies at various pH values by inputting the $pKa$ values. The cost effectiveness of each of the amines can be estimated by taking the price of the product and dividing by the efficiency. For compounds more efficient than HMDA, the apparent price will be less than the actual price, for products less efficient than HMDA the apparent price will be greater.

While substantially all of the commercially available amines have been mentioned, there are some other products which although not listed in the Buyer's Guide are of interest, one of which is 1,5-pentamethylenediamine. This compound is listed in the CRC table of organic compounds.

It will be apparent from the above description that the present invention offers several advantages over the prior art in that it substantially eliminates noxious odours, poses little threat to the environment, is at least as effective as a clay stabilizing agent as the prior art and is a cost effective alternative to the prior art. In addition, initial testing suggests that HMDA is 10 to 40 times less toxic than comparable quantities of TMAC.* It will also be understood that while the description provided herein contains many specificities, these should not be construed as limiting the scope of the present invention. As disclosed herein several substitutions and variations may be made to the present invention without departure from the spirit of the invention. Thus the scope of the present invention should be determined by the appended claims and their legal equivalents.

*These tests are ongoing. Substantiating data will be provided when available

We claim:

1. A clay stabilizing agent to inhibit clay swelling in subterranean formations, the stabilizing agent comprising an effective amount of at least one organic amine selected from the group consisting of primary diamines with a chain length of 8 or less carbon atoms and primary alkyl amines with a chain length of 4 or less carbon atoms.

2. The stabilizing agent of claim 1 wherein the agent is deliverable to the subterranean formation by entrainment of the agent in an aqueous carrier fluid.

3. The stabilizing agent of claim 1 wherein the organic amine is hexamethylenediamine.

4. The stabilizing agent of claim 3 wherein the hexamethylenediamine is present in the carrier fluid in an amount of at least 0.03% by volume of the carrier fluid.

5. The stabilizing agent of claim 3 wherein the hexamethylenediamine is present in the carrier fluid in an amount of about 0.06% to 0.3% by volume of the carrier fluid.

6. The stabilizing agent of claim 1 wherein the organic amine is ethylenediamine.

7. The stabilizing agent of claim 1 wherein the organic amine is propylenediamine.

8. The stabilizing agent of claim 1 wherein the organic amine is hepatmethylenediamine.

9. The stabilizing agent of claim 1 wherein the organic amine is butanediamine.

10. The stabilizing agent of claim 1 wherein the organic amine is pentanediamine.

11. The stabilizing agent of claim 1 wherein the organic amine is 1,5-diaminohexane.

12. The stabilizing agent of claim 1 wherein the organic amine is 1,3-diaminoentane.

13. A method of treating subterranean formations to substantially prevent swelling of the formation clay in response to contact with foreign fluids, comprising the steps of:

preparing a clay stabilizing agent by selecting an effective amount of at least one organic amine from the group consisting of primary diamines with a chain length of 8 or less carbon atoms and primary alkyl amines with a chain length of 4 or less carbon atoms;

entraining the stabilizing agent in an aqueous carrier fluid; and contacting the formation clay with the carrier fluid containing the stabilizing agent.

14. The method of claim 13 wherein the organic amine selected is hexamethylenediamine.

15. The method of claim 14 wherein the hexamethylenediamine is entrained in the carrier fluid in an amount of at least 0.03% by volume of the fluid.

16. The method of claim 14 wherein the hexamethylenediamine is entrained in the carrier fluid in an amount of about 0.06% to 0.03% by volume of the fluid.

* * * * *